United States Patent
Lin et al.

(10) Patent No.: US 7,876,963 B2
(45) Date of Patent: Jan. 25, 2011

(54) SYMBOL RECOGNITION METHOD

(75) Inventors: Ming-Hung Lin, Taipei (TW); Chih-Wei Lin, Taipei (TW)

(73) Assignee: Compal Electronics, Inc., Neihu, Taipei (TW)

( * ) Notice: Subject to any disclaimer, the term of this patent is extended or adjusted under 35 U.S.C. 154(b) by 818 days.

(21) Appl. No.: 11/846,628

(22) Filed: Aug. 29, 2007

(65) Prior Publication Data

US 2008/0166055 A1 Jul. 10, 2008

(30) Foreign Application Priority Data

Jan. 5, 2007 (TW) .............................. 96100591 A

(51) Int. Cl.
*G06K 9/48* (2006.01)
*G06K 9/62* (2006.01)

(52) U.S. Cl. .................. 382/200; 382/199; 382/224

(58) Field of Classification Search .................. 382/181, 382/199, 200, 206, 218, 224, 288
See application file for complete search history.

(56) References Cited

U.S. PATENT DOCUMENTS

| | | | | |
|---|---|---|---|---|
| 4,685,141 A | * | 8/1987 | Hoque et al. | 382/138 |
| 5,251,268 A | * | 10/1993 | Colley et al. | 382/156 |
| 5,544,261 A | | 8/1996 | Bellegarda et al. | |
| 6,345,119 B1 | | 2/2002 | Hotta et al. | |
| 7,454,063 B1 | * | 11/2008 | Kneisl et al. | 382/187 |

* cited by examiner

*Primary Examiner*—Daniel G Mariam
(74) *Attorney, Agent, or Firm*—Thomas, Kayden, Horstemeyer & Risley, LLP

(57) ABSTRACT

A symbol recognition method for increasing the symbol recognition speed by the processor includes the steps of obtaining a pixel density value and an aspect ratio of the symbol image. Then, the center-point value and the corresponding radius value are obtained by a partitional clustering algorithm. In sequence, a pixel density value and the aspect ratio of the under recognized image are obtained, and compared with the values of the symbol image to determine whether the under recognized image is a single symbol image or not.

15 Claims, 5 Drawing Sheets

```
0  0  0  1  0  0  0

0  0  1  0  1  0  0

0  0  1  0  1  0  0

0  1  0  0  0  1  0

0  1  1  1  1  1  0

1  0  0  0  0  0  1

1  0  0  0  0  0  1
```

SYMBOL RECOGNITION METHOD

RELATED APPLICATION

This application claims priority to Taiwan Application Serial Number 96100591, filed Jan. 5, 2007, which is herein incorporated by reference.

BACKGROUND

1. Field of Invention

The present invention relates to an image recognition method. More particularly, the present invention relates to a symbol image recognition method.

2. Description of Related Art

Transferring correctly and speedily a symbol from a paper hardcopy to a computer for editing is an important topic in the digital information age. The common method is to transfer the paper image to the computer using a scanner or other image capture device. Then, the computer recognizes the paper image. Therefore, the symbol images on the paper are transferred into the character assembly that a computer can edit.

However, symbol images on paper must be analyzed first to increase the recognition accuracy. The symbol image analysis process is used to ensure every symbol image is a single symbol and divide the connected symbol image. When the symbol image includes a plurality of connected symbols and recognizes it directly, a recognition error may occur. For example, when a "www" symbol image connected by one line on a paper hardcopy is scanned and recognized directly, the error recognition may occur because the spaces between the letters "w" are too close. Hence, in order to increase the recognition accuracy, the symbol image "www" can be analyzed and divided into three symbol images "w" then recognized respectively.

There are many recognition or analysis methods to determine whether the symbol image is a single symbol image or not and divide a connected symbol image. However, common image recognition and analysis processes need complex operations and consume a lot of hardware resources. Hence, the recognition function is not suitable for the probable electronic devices having low processing power.

Therefore, it is desirable to reduce the complexity and the hardware resource requirements of the symbol image recognition or analysis methods, and increase the symbol image recognition or analysis speed.

SUMMARY

The invention of the embodiment provides a symbol recognition method to increase the symbol recognition speed by the processor. The steps comprise acquiring a plurality of symbol images, obtaining a pixel density value and an aspect ratio of the symbol image, obtaining a plurality of center-point values and a plurality of radius values of the symbol images through processing the density values and the aspect ratios of the symbol images based on a partitional clustering algorithm. Moreover, the steps comprise acquiring a under recognized image, obtaining a pixel density value and an aspect ratio of the under recognized image, and comparing the distance between a recognized point value determined by the pixel density value and the aspect ratio of the under recognized image and one of the center-point values with the radius value corresponding to one of the center-point values. Wherein the under recognized image is determined to be a single symbol image when the distance is smaller than the radius value corresponding to the center-point value, and the under recognized image is determined to be a connected symbol image when the distance is larger than the radius value corresponding to the center-point value.

According embodiment of the invention, a symbol recognition method for increasing the symbol recognition speed by the processor is disclosed. The steps comprise acquiring a plurality of symbol images, obtaining a pixel density value and an aspect ratio of the symbol image, obtaining a plurality of center-point values and a plurality of radius values of the symbol images through processing the density values and the aspect ratios of the symbol images based on a partitional clustering algorithm. Moreover, the steps further comprise acquiring a under recognized image, obtaining a pixel density value and an aspect ratio of the under recognized image. Then a distance between a recognized point value determined by the pixel density value and the aspect ratio of the under recognized image and one of the center-point value is compared with the radius value corresponding to the center-point value. In sequence, the under recognized image is determined to be a single symbol image when the distance is smaller than the radius value corresponding to the center-point value. In addition, when the distance is larger than the radius value corresponding to the center-point value, the under recognized image is analyzed by a symbol edge detection. When the under recognized image is determined to be a connected symbol image according to the results of the symbol edge detection, the under recognized image is divided.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
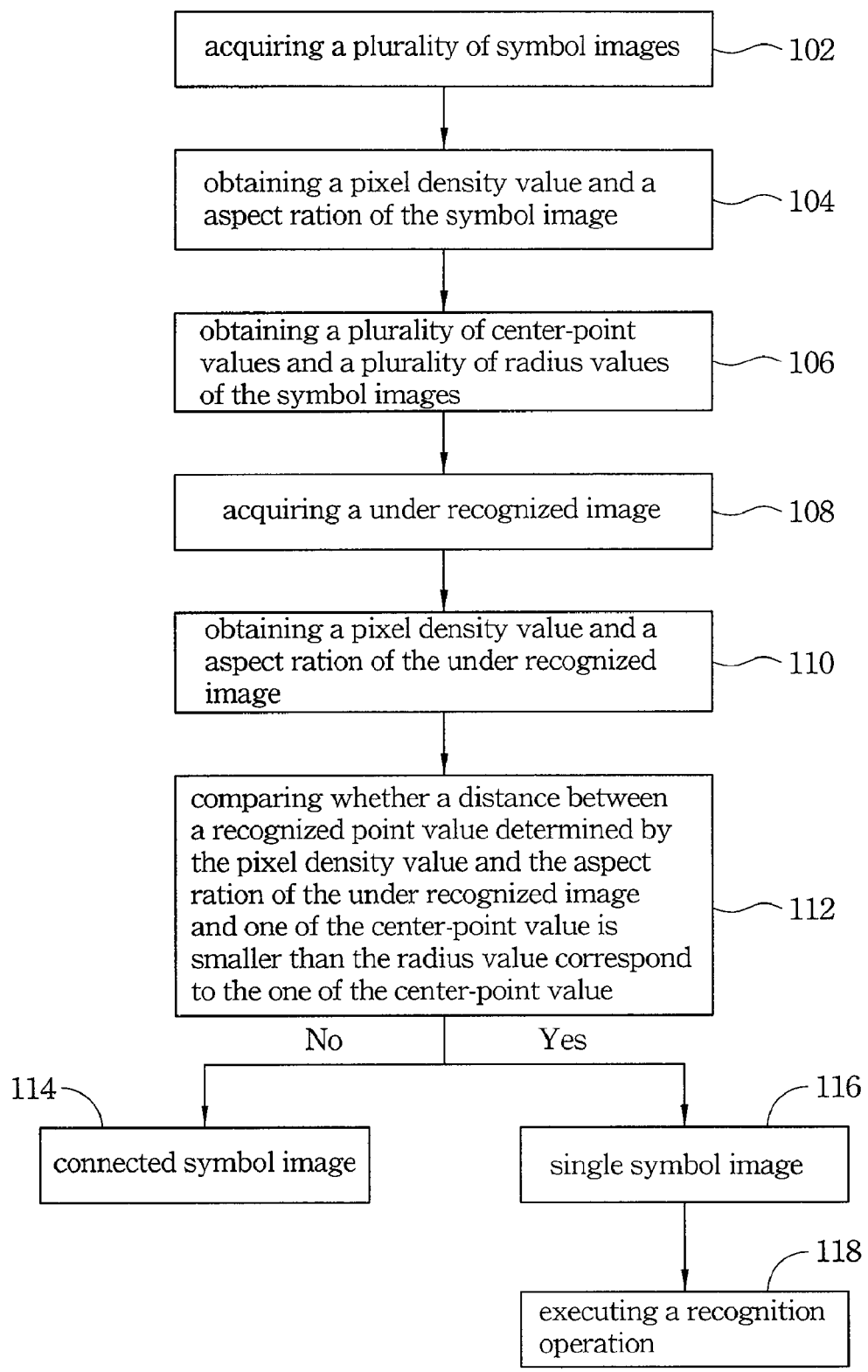
FIG. 1 depicts the flow chart of the first embodiment.

Reference will now be made in detail to the present preferred embodiments of the invention, examples of which are illustrated in the accompanying drawings. Wherever possible, the same reference numbers are used in the drawings and the description to refer to the same or like parts.

The embodiments of the invention use the partitional clustering algorithm to obtain the recognition data of the symbol images and the under recognized image. Then the recognition data of the under recognized image is compared with the recognition data of the symbol images. Hence, the speed of the recognition process is increased and hardware resources required for the recognition process are decreased. Some one skilled in the art can change the parameters of the method to adjust the recognition speed or the recognition accuracy of the recognition method.

First Embodiment

Figures 2, 3:
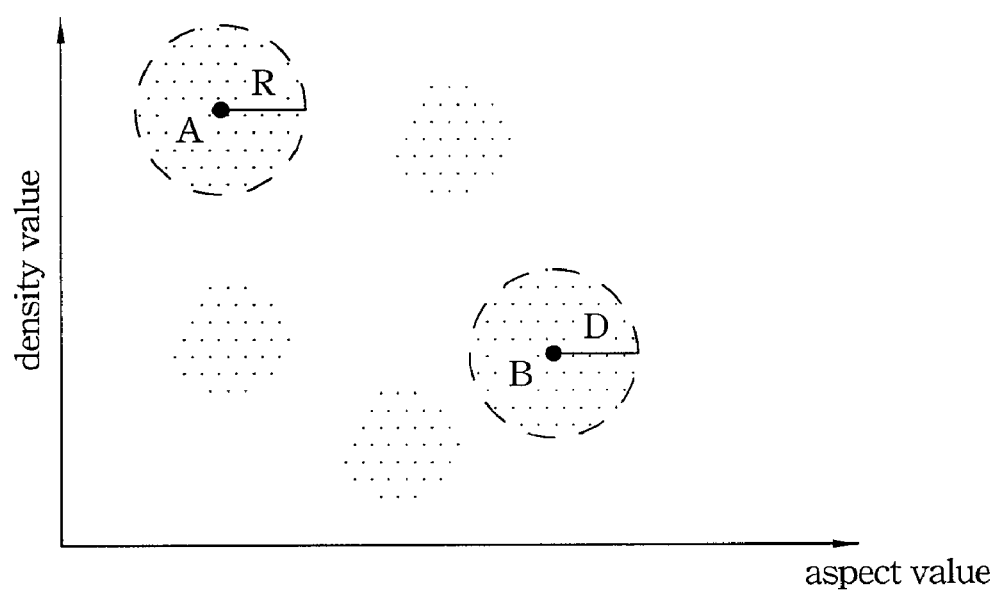
FIG. 2 depicts the acquired image of the embodiment.
FIG. 3 depicts the diagram of the partitional clustering data of the embodiment.

Please refer to FIG. 1, FIG. 2 and FIG. 3 together. FIG. 1 is a flow chart of the first embodiment. FIG. 2 depicts the acquired image of the embodiment. FIG. 3 is a diagram of the partitional clustering data of the embodiment. The symbol recognition method of the embodiment can increase the symbol recognition speed by the processor and reduce the consumption of the hardware resources. In step 102, a plurality of symbol images are acquired. In step 104, a pixel density value and an aspect ratio of the symbol image are obtained. In step 106, a plurality of center-point values and the a plurality of radius values are obtained through processing the pixel density values and the aspect ratios of the symbol images based on a partitional clustering algorithm. Wherein the center-point values are the cluster centroids obtained by the partitional clustering algorithm.

Step 102 to step 106 build a comparative partitional clustering database of the symbol images. A symbol image shown in FIG. 2, the symbol is a letter A. The pixel density value of the symbol image is 16/49, the aspect ratio of the symbol image is 7/7. Of course the pixel density value and the aspect ratio of the symbol image change with the parameters such as the image size, resolution and different symbols.

In order to express the relationship of the partitional clustering data, pixel density value and the aspect ratio, please refer to FIG. 3. In this embodiment, the aspect ratio is a transverse axis, the pixel density value is a longitudinal axis. Hence, the pixel density value and the aspect ratio of the symbol image can mark on this coordinate system. Then these data are processed by the partitional clustering, and the plurality of center point value A and B and the corresponding radius value R and D are obtained. The points surrounded by the circles formed by the center-point value A and B and the corresponding radius value R and D are the symbol images having the similar features.

In sequence, in step 108, an under recognized image is acquired. In step 110, a pixel density value and an aspect ratio of the under recognized image are obtained. Then, in step 112, a distance between a recognized point value determined by the pixel density value and the aspect ratio of the under recognized image and one of the center-point values is compared with the radius value corresponding to the center-point value. Go to step 114, when the distance is larger than the radius value corresponding to the center-point value then the under recognized image is determined to be a connected symbol image. Go to step 116, when the distance is smaller than the radius value corresponding to the center-point value, then the under recognized image is determined to be as a single symbol image. In step 116, the under recognized image is determined to be a single symbol image, then in step 118, the under recognized image is recognized by a recognition operation to identify the symbol. In this embodiment, the comparing step 112 compares the distance between the recognized point value determined by the pixel density value and the aspect ratio of the under recognized image and one of the center-point value with 0.7 times the radius value corresponding to the center-point value. When the determined standard (0.7 times of the radius value) is more strict, the recognition accuracy increases. Moreover, the partitional clustering algorithm is a K-means clustering in this embodiment.

The comparative database is built through the partitional clustering algorithm. In sequence, the pixel density value and the pixel density value of the under recognized image are used to determine whether the recognized image is a connected symbol image or a single symbol image. Hence, the compared data is much less and smaller, and the compared process does not need complex operations so that the image recognition is speedily.

Second Embodiment

The partitional clustering comparing method described above can be combined with common image recognition to increase the speed of image recognition.

Figure 4:
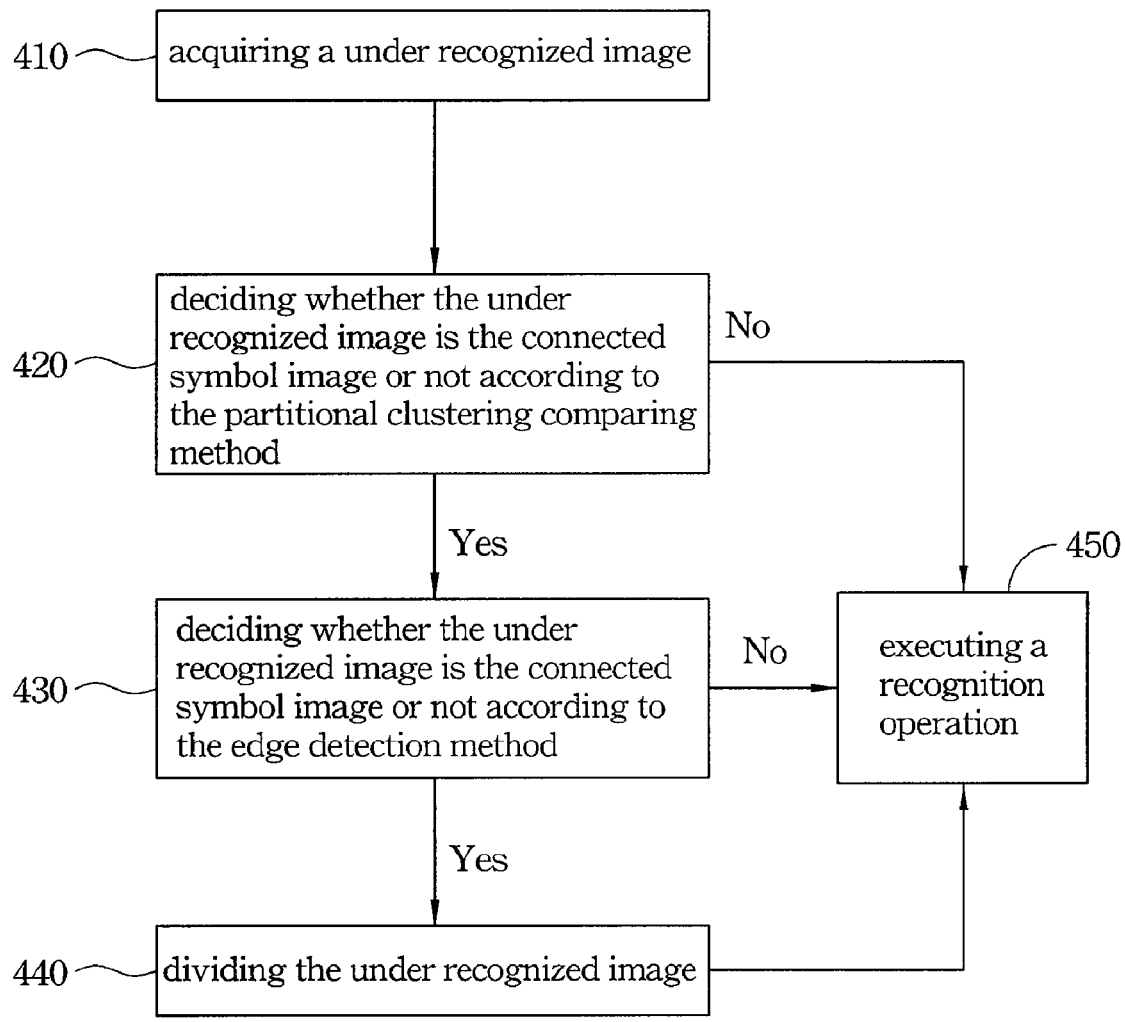
FIG. 4 depicts the flow chart of the second embodiment.

Please refer to FIG. 4. FIG. 4 depicts the flow chart of the second embodiment. In step 410, an under recognized image is acquired. In step 420, the under recognized image is determined to be a connected symbol image or a single symbol image through the partitional clustering comparing method described above. When the under recognized image is determined to be a single symbol the process goes to step 450. In step 450 the recognition operation is executed on the under recognized image. When the under recognized image is determined to be a connected symbol image the process goes to step 430 where the under recognized image is analyzed through a symbol edge detection. In step 430, when the analysis result determines the symbol image is not a connected symbol image the process goes to step 450 where the recognition operation is executed on the under recognized image. When the analysis result determines the symbol image is a connected symbol image the process goes to step 440 where the under recognized image is divided.

Figure 5:
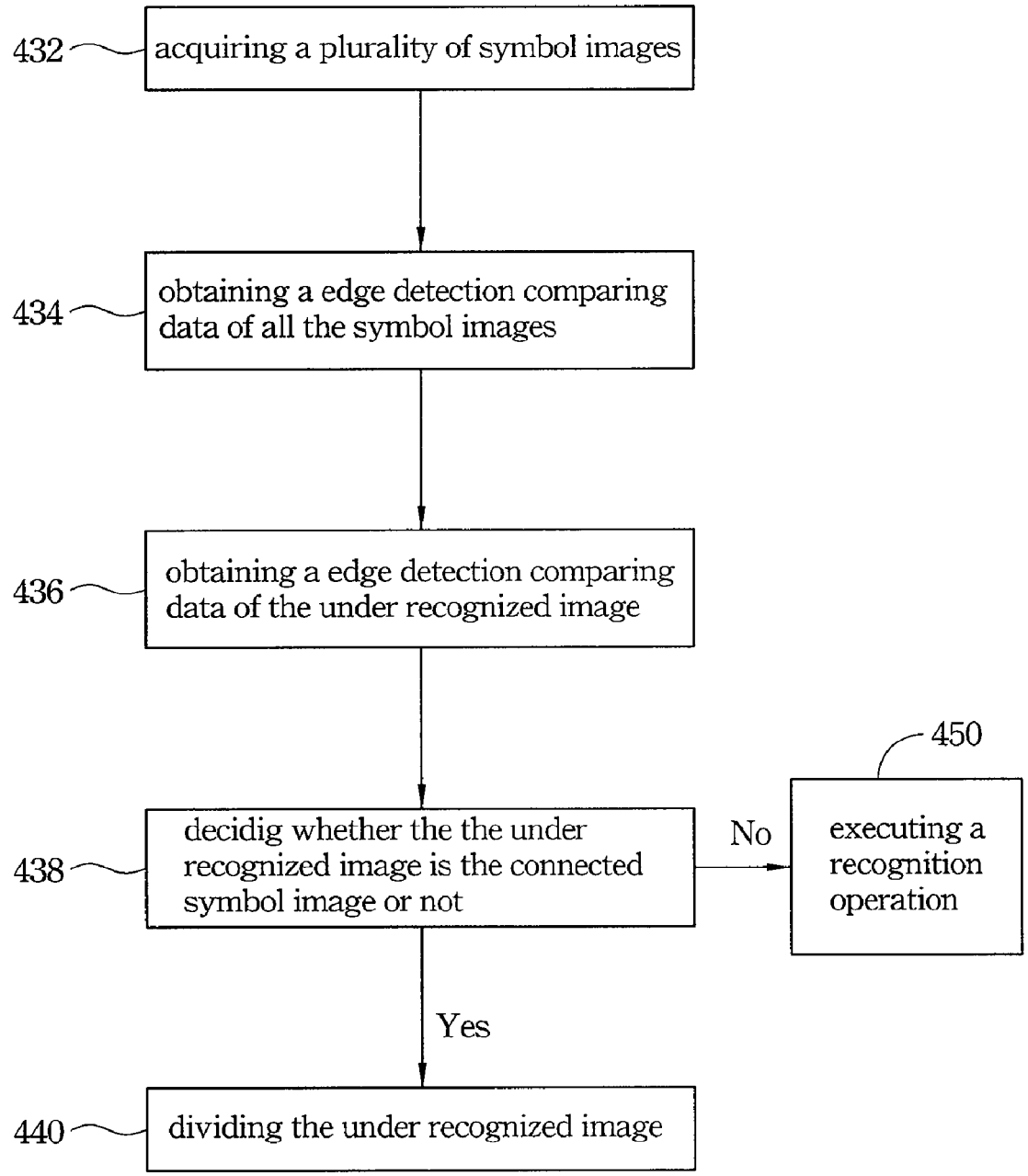
FIG. 5 depicts the flow chart of the of the symbol edge detection analyze of second embodiment.

The partitional clustering comparing method in step 420 is described in detail above, and the symbol edge detection is known in the art, therefore, the theorem and detail are not described herein. Please refer to FIG. 5. This figure is a flow chart of the symbol edge detection in step 430. In step 432, the plurality of symbol images are acquired. In step 434, an edge detection comparing data of all the symbol images are obtained. The object of step 432 and step 434 is used to build the edge detection comparing data of every symbol. In sequence, in step 436, edge detection comparing data of the under recognized image is obtained. In step 438, the edge detection comparing data of the under recognized image is compared with the edge detection comparing data of one symbol image. When the symbol image is determined to be a single symbol image the process goes to step 450, the recognition operation is executed on the under recognized image to identify the symbol. When the symbol image is determined to be a connected symbol image the process goes to step 440, the under recognized image is divided.

The edge detection comparing data includes many characteristics comparing data such as the edge over area ratio data and aspect ratio data. Therefore, when there is a difference between a specific ratio of the edge detection comparing data of the under recognized image and the edge detection comparing data of one symbol image is less than a threshold value, the under recognized image is determined to be a single symbol image. When the difference between the specific ratio of the edge detection comparing data of the under recognized image and the edge detection comparing data of one symbol image is at least the threshold value, the under recognized image is determined to be a connected symbol image. In this embodiment, the threshold is set as 10%. That is, when the difference between the specific ratio of the edge detection comparing data of the under recognized image and the edge detection comparing data of one symbol image is less than 10%, the under recognized image is determined to be a single symbol image, and at least 10%, the under recognized image is determined to be a connected symbol image. Other embodiments can adjust the threshold for other applications.

Figure 6:
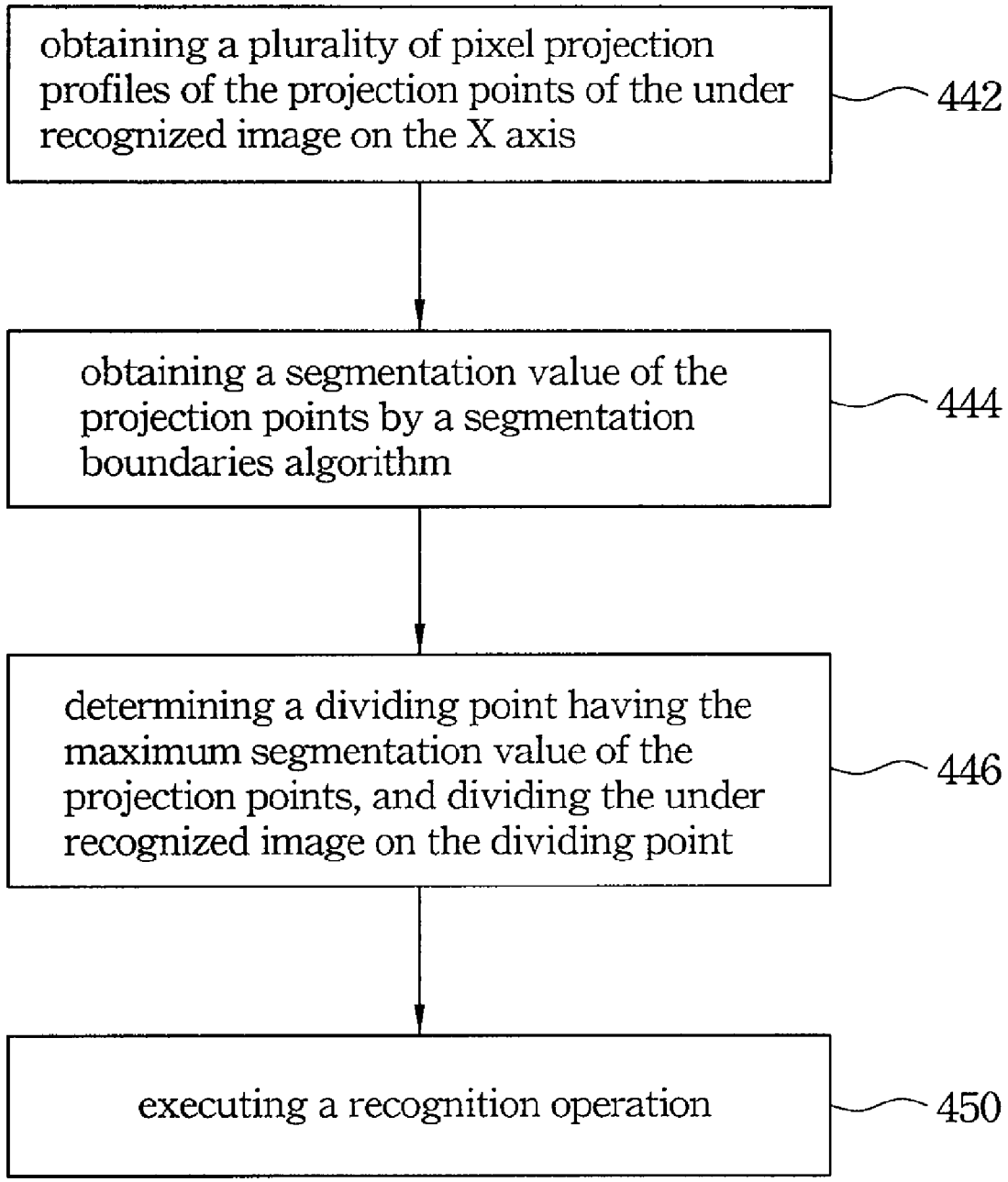
FIG. 6 depicts the flow chart of the image division of the second embodiment.

Please refer to FIG. 6. FIG. 6 depicts the flow chart of the image division of the second embodiment. In step 442, a plurality of pixel projection profiles of the projection points of the connected symbol image (the under recognized image which determined as the connected symbol image) on the X axis are obtained. In step 444, a segmentation value of every projection point is obtained with a segmentation boundaries algorithm. In step 446, a dividing point with the maximum segmentation value of the project points is determined, and the under recognized image is divided on the dividing point. In step 450, the divided under recognized image is recognized by the recognition operation after step 446 to identify the symbol.

The first embodiment uses the partitional clustering algorithm to create the comparing database, and recognizes the under recognized image by the partitional clustering comparing method to increase the recognition speed. The second combines the recognition method of the first embodiment with the edge detection method. The under recognized image is recognized by the partitional clustering comparing method first. Then the under recognized image whether is recognized by the complex edge detection method or not according to the result of the partition clustering comparing method. Hence, the complexity and the consuming hardware resource of the symbol image recognition is reduced and the speed of symbol image recognition is increased.

Although the present invention has been described in considerable detail with reference t certain preferred embodiments thereof, other embodiments are possible. Therefore, their spirit and scope of the appended claims should no be limited to the description of the preferred embodiments container herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A symbol recognition method for increasing the symbol recognition speed by the processor, comprising:
    acquiring a plurality of symbol images;
    obtaining a pixel density value and an aspect ratio of the symbol image;
    obtaining a plurality of center-point values and a plurality of radius values of the symbol images through processing the pixel density values and the aspect ratios of the symbol images based on a partitional clustering algorithm;
    acquiring an under recognized image;
    obtaining a pixel density value and an aspect ratio of the under recognized image; and
    comparing a distance between a recognized point value determined by the pixel density value and the aspect ratio of the under recognized image and one of the center-point value with the radius value corresponding to the center-point value;
    wherein determining the under recognized image is a single symbol image when the distance is smaller than the radius value corresponding to the center-point value, and
    determining the under recognized image is a connected symbol image when the distance is larger than the radius value corresponding to the center-point value.

2. The symbol recognition method of claim 1, wherein the comparing step compares the distance between the recognized point value determined by the pixel density value and the aspect ratio of the under recognized image and the center-point value with 0.7 times the radius value corresponding to the center-point value.

3. The symbol recognition method of claim 1, wherein when the determining step determines the under recognized image as the single symbol image, a recognition operation is executed on the under recognized image.

4. The symbol recognition method of claim 1, wherein the partitional clustering algorithm is K-means clustering.

5. The symbol recognition method of claim 1, wherein the partitional clustering algorithm is K-means clustering.

6. A symbol recognition method for increasing the symbol recognition speed by the processor, comprising:
    acquiring a plurality of symbol images;
    obtaining a pixel density value and an aspect ratio of the symbol image;
    obtaining a plurality of center-point values and a plurality of radius values of the symbol images through processing the pixel density values and the aspect ratios of the symbol image based on a partitional clustering algorithm;
    acquiring an under recognized image;
    obtaining a pixel density value and an aspect ratio of the under recognized image;
    comparing a distance between a recognized point value determined by the pixel density value and the aspect ratio of the under recognized image and one of the center-point value with the radius value corresponding to the center-point value;
    determining the under recognized image as a single symbol image when the distance is smaller than the radius value corresponding to the center-point value;
    analyzing the under recognized image by a symbol edge detection when the distance is larger than the radius value corresponding to the center-point value; and
    dividing the under recognized image when the under recognized image being determined as a connected symbol image according to the results of the symbol edge detection.

7. The symbol recognition method of claim 6, wherein the comparing step compares the distance between the recognized point value determined by the pixel density value and the aspect ratio of the under recognized image and the center-point value with 0.7 times of the radius value corresponding to the center-point value.

8. The symbol recognition method of claim 6, wherein when the determining step determines the under recognized image as the single symbol image, a recognition operation is executed on the under recognized image.

9. The symbol recognition method of claim 6, wherein the analyzing step further comprises:
    obtaining an edge detection comparing data of all the symbol images;
    obtaining an edge detection comparing data of the under recognized image;
    comparing the edge detection comparing data of the under recognized image with the edge detection comparing data of one symbol image;
    wherein determining the under recognized image is the single symbol image when the difference between a specific ratio of the edge detection comparing data of the under recognized image and the edge detection comparing data of one symbol image is less than a threshold value, and
    determining the under recognized image is a connected symbol image when the difference between a specific ratio of the edge detection comparing data of the under recognized image and the edge detection comparing data of one symbol image is at least the threshold value.

10. The symbol recognition method of claim 9, wherein determining the under recognized image is the single symbol image when the difference between the specific ratio of the edge detection comparing data of the under recognized image and the edge detection comparing data of one symbol image is less than 10%.

11. The symbol recognition method of claim 10, wherein determining the under recognized image is the connected symbol image when the difference between the specific ratio of the edge detection comparing data of the under recognized image and the edge detection comparing data of one symbol image is at least 10%.

12. The symbol recognition method of claim 9, wherein when the determining step determines the under recognized image as the single symbol image, the recognition operation is executed on the under recognized image.

13. The symbol recognition method of claim 9, wherein the edge detection comparing data of the symbol images comprises the edge over area ratio data and aspect ratio data of the symbol images, the edge detection comparing data of the under recognized image comprises the edge over area ratio data and aspect ratio of the under recognized image.

14. The symbol recognition method of claim 6, wherein the dividing step further comprises:
   obtaining a plurality of pixel projection profiles of the projection points of the under recognized image on the X axis;
   obtaining a segmentation value of the projection points by a segmentation boundaries algorithm; and
   determining a dividing point having the maximum segmentation value of the projection points, and dividing the under recognized image on the dividing point.

15. The symbol recognition method of claim 6, further comprises:
   executing the recognition operation on the divided under recognized image after the dividing step.

* * * * *